United States Patent
Ishida

[19]

[11] Patent Number: 6,079,278
[45] Date of Patent: Jun. 27, 2000

[54] BALL SPLINE JOINT SLACKNESS MEASURING METHOD AND MEASURING APPARATUS

[75] Inventor: Hideo Ishida, Tokyo, Japan

[73] Assignee: Nissan Motor Co., Ltd., Yokohama, Japan

[21] Appl. No.: 09/179,422

[22] Filed: Oct. 27, 1998

[30] Foreign Application Priority Data

Nov. 5, 1997 [JP] Japan .................................... 9-302927

[51] Int. Cl.[7] ...................................................... G01N 3/00
[52] U.S. Cl. ............................................ 73/796; 73/118.1
[58] Field of Search .................... 73/796, 118.1; 384/45, 43; 474/11, 17, 25

[56] References Cited

U.S. PATENT DOCUMENTS 4,695,170  9/1987  Teramachi ................................. 384/45

FOREIGN PATENT DOCUMENTS

3-199719  8/1991  Japan ................................ F16D 3/06

*Primary Examiner*—Max Noori
*Attorney, Agent, or Firm*—Foley & Lardner

[57] ABSTRACT

Slackness of a ball spline joint which engages a first member of a circular shape and a second member fitted outside of the first member is measured by measuring a displacement of a first measurement point (P1) and a second measurement point (P2). The measurement points are set on the radial line passing through the center of the first member and the center of the spline groove. Using the distances (R1, R2) between the center of the first member and the measurement points (P1, P2), and the displacement amount (A1, A2) of the measurement points (P1, P2) under a predetermined relative torque, the slackness of the joint is calculated. By arranging the measurement points (P1, P2) on either side of the center of the first member, the effect of measurement error in the displacement amount (A1, A2) on the calculation is reduced.

8 Claims, 6 Drawing Sheets

FIG. 9 PRIOR ART

BALL SPLINE JOINT SLACKNESS MEASURING METHOD AND MEASURING APPARATUS

FIELD OF THE INVENTION

This invention relates to the measurement of slackness of ball spline joint.

BACKGROUND OF THE INVENTION

In a ball spline joint which regulates the rotation of a shaft and permits only displacement in an axial direction, many balls are held in a space between an inner spline groove formed in outer circumference of a shaft and an outer spline groove formed in the inner circumference of a support member.

In the case of this joint structure, machining error of the spline grooves causes scatter in the clearance between the balls and spline grooves. As a result, slackness between a shaft and support member easily becomes uneven. However, slackness which is too large or too small reduces the durability of the joint.

The slackness can be quantized by inserting measuring balls with a predetermined diameter smaller than those used in the product and measuring how much the outer spline groove can displace relative to the inner spline groove in a circumferential direction.

It is also known that the slackness of the product can be maintained within a fixed range by varying the diameters of the balls assembled in the spline grooves according to the quantized slackness.

Figure 8:
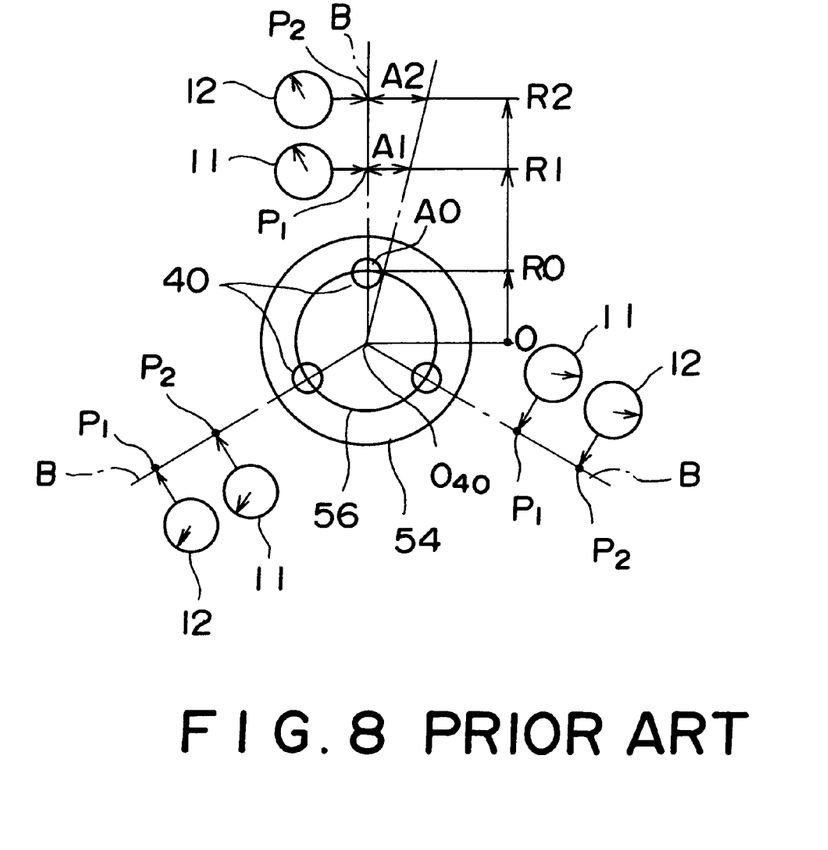
FIG. 8 is a diagram describing a prior art method for measuring slackness of the ball spline joint.

The principle of a measuring apparatus for measuring slackness for this purpose is shown in FIG. 8.

In this figure, spline grooves are respectively formed between an outer circumference of a shaft 56 and inner circumference of a boss 54, a large number of balls being held in these spline grooves.

When the boss 54 is rotated in the forward and backward directions with a predetermined torque, a first measurement point P1 and second measurement point P2 which have been set to rotate with the boss 54 also move. The travel distance A1 of the measurement point P1, and the travel distance A2 of the measurement point P2 are respectively measured by a first gauge 11 and second gauge 12.

The first measurement point P1 and second measurement point P2 are set on a straight line B which intersects with the center line of a spline groove and a center axis $O_{40}$ of the shaft 56.

The first measurement point P1 is set at a distance R1 from the center axis $O_{40}$, and the second measurement point P2 is set at a distance R2 from the same.

A slackness A0 is computed by the following equation from the distances A1, A2 through which these measurement points P1, P2 displace due to the rotation of the boss 54.

$$A0 = \frac{A1 \cdot (R2 - R0) - A2 \cdot (R1 - R0)}{R2 - R1} \quad (1)$$

where, R0=diameter of shaft.

Figure 9:
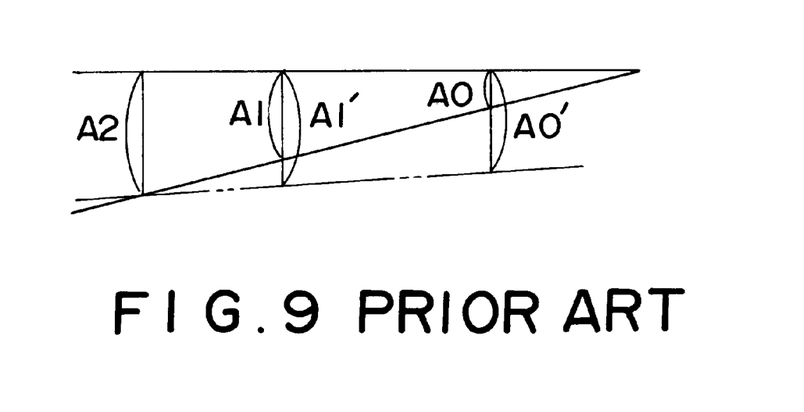
FIG. 9 is a diagram describing an error in the prior art method.

In this measurement method, the first measurement point P1 and second measurement point P2 are set on the same radial line. Therefore, as shown in FIG. 9, when for example the measurement value A1 is obtained as a value A1' having a certain positive error, the computed value A0' of the slackness is computed to be much larger than the actual value A0. As a result, the measurement error in the slackness A0 is too large.

SUMMARY OF THE INVENTION

It is therefore an object of this invention to increase the measurement precision of slackness of a ball spline joint.

In order to achieve the above objects, this invention provides a method of measuring slackness of a ball spline joint which comprises a first groove formed on a circular outer circumference of a first member, a second groove formed on an inner circumference of a second member which is fitted on the outer circumference of the first member, and a ball arranged between the grooves. The method comprises the steps of setting a first measurement point at a predetermined distance from a center of the first member on a radial line passing through the center and a center of the first spline groove, setting a second measurement point at another predetermined distance from the center on the radial line such that the first measurement point and the second measurement point are arranged on either side of the center, applying a predetermined relative rotational torque between the first member and the second member, and computing a slackness of the joint based on a displacement amount of the first measurement point and a displacement amount of the second measurement point under the predetermined relative rotational torque, It is preferable that the slackness is computed by the following equation:

$$A0 = \frac{A2 \cdot (R0 + R1) - A1 \cdot (R2 - R0)}{R1 + R2}$$

where, R0=radius of first member,

R1=distance from center of first member to first measurement point,

R2=distance from center of first member to second measurement point.

A1=displacement amount of first measurement point, and

A2=displacement amount of second measurement point

When the joint comprises plural pairs of first and second grooves, it is further preferable that the method further comprises the steps of setting first measurement points and second measurement points on respective radial lines corresponding to the plural pairs of first and second grooves, computing slackness values from respective pairs of the first and second measurement points, and determining the slackness as to be equal to the largest value of the slackness values.

It is also preferable that the method further comprises the steps of applying a plurality of predetermined relative rotational torques, and determining the slackness to be equal to the slackness when the rotational torque is 0 which is obtained based on a recurrence line joining the displacement amounts of the first measurement points under the predetermined relative rotational torques, and a recurrence line joining the displacement amounts of the second measurement points under the predetermined relative rotational torques.

It is also preferable that the method further comprises a step of applying a vibration to the first member and the second member under the action of the predetermined relative rotational torque. This vibration is preferably a vibration in the circumferential direction of a circle forming a fitting surface between the first member and the second member.

This invention also provides an apparatus for measuring slackness of a ball spline joint which comprises a first groove formed on a circular outer circumference of a first member, a second groove formed on an inner circumference of a second member which is fitted on the outer circumference of the first member, and a ball arranged between the grooves.

The measuring apparatus comprises a member for supporting the first member, a member for supporting the second member, a first gauge for measuring a rotational displacement of a first measurement point set at a first distance from a center of the first member on a radial line passing through the center and a center of the first groove, a second gauge for measuring a rotational displacement of a second measurement point set at a second distance from the center on the radial line such that the first measuring point and second measuring point being arranged on either side of the center, a mechanism for applying a predetermined relative rotational torque to the first member and the second member when the ball is gripped between the grooves and a microprocessor programmed to calculate a slackness of the joint from the displacement of the first measurement point and the displacement of the second measurement point under the predetermined relative rotational torque.

It is preferable that the apparatus further comprises a vibrator for applying a vibration to the first member and the second member in the direction along an engaging surface between the first member and the second member.

The details as well as other features and advantages of this invention are set forth in the remainder of the specification and are shown in the accompanying drawings.

DESCRIPTION OF THE PREFERRED EMBODIMENTS

Figure 7:
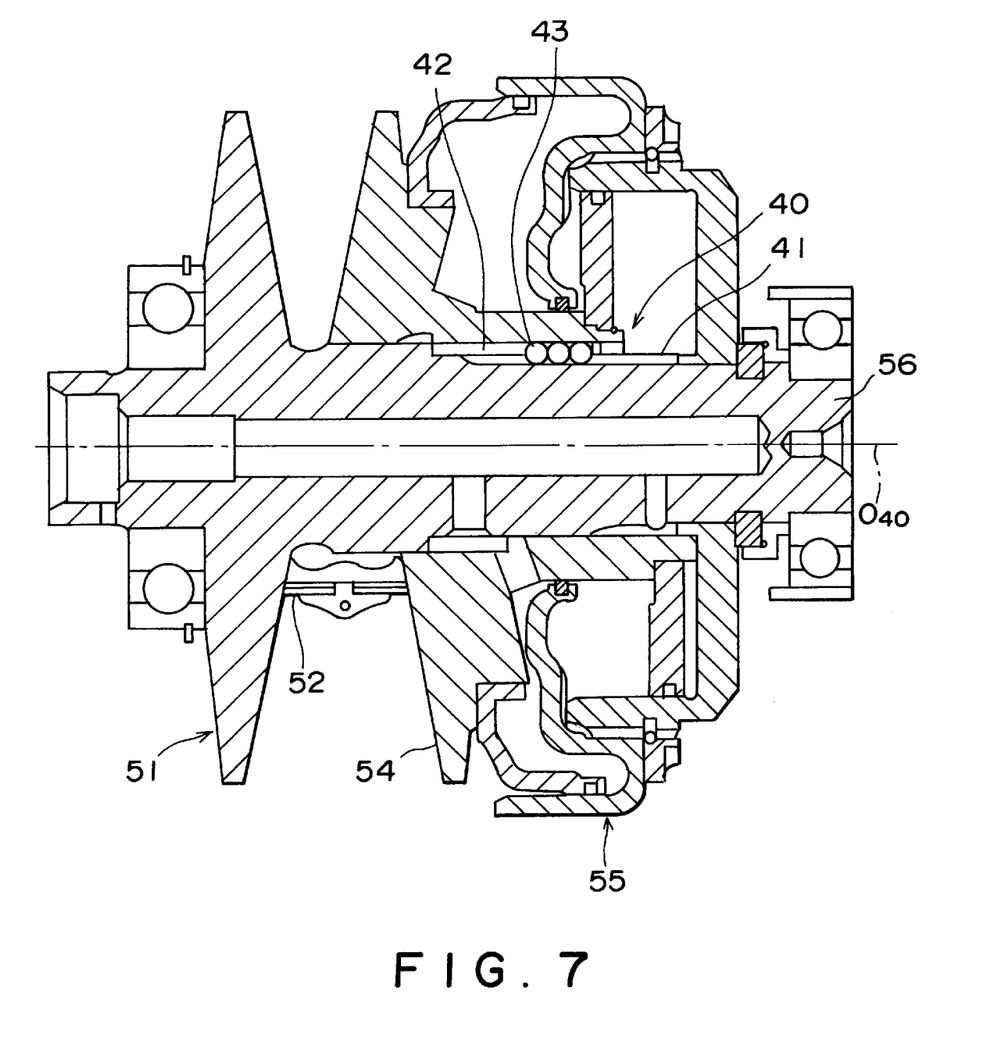
FIG. 7 is a longitudinal sectional view of a continuously variable transmission in which the ball spline joint is applied.

A slackness measuring apparatus according to this invention has the object of measuring the looseness of a ball spline joint 40 used for a V-belt continuously variable transmission for a vehicle shown in FIG. 7.

The V-belt continuously variable transmission comprises a movable pulley comprising a fixed wheel 51 of which the displacement in an axial direction is prevented, and a slide wheel 54 free to displace in the axial direction, and a V-belt 52 is looped in a V-shaped groove formed between the wheels. The slide wheel 54 corresponds to the boss 54 of the aforesaid prior art example.

The slide wheel 54 engages with the outer circumference of a rotation shaft 56 formed in a one-piece construction with the fixed wheel 51 via the ball spline joint 40, and it displaces in an axial direction above the rotation shaft 56 according to the oil pressure of a hydraulic cylinder 55.

The ball spline joint 40 comprises plural spline grooves 41 cut in the outer circumference of the rotation shaft 56, plural spline grooves 42 cut in the inner circumference of the slide wheel 54, and plural balls 43 held in the space formed by these spline grooves 41, 42. The spline grooves 41, 42 are formed with equal angular intervals.

The balls 43 situated in the spline grooves 41 and 42 limits relative rotation of the rotation shaft 56 and slide wheel 54 while permitting their relative displacement in the axial direction.

The slackness measuring apparatus measures slackness of this ball spline joint 40 using measuring balls 10 of smaller diameter than the balls 43.

Figure 3:
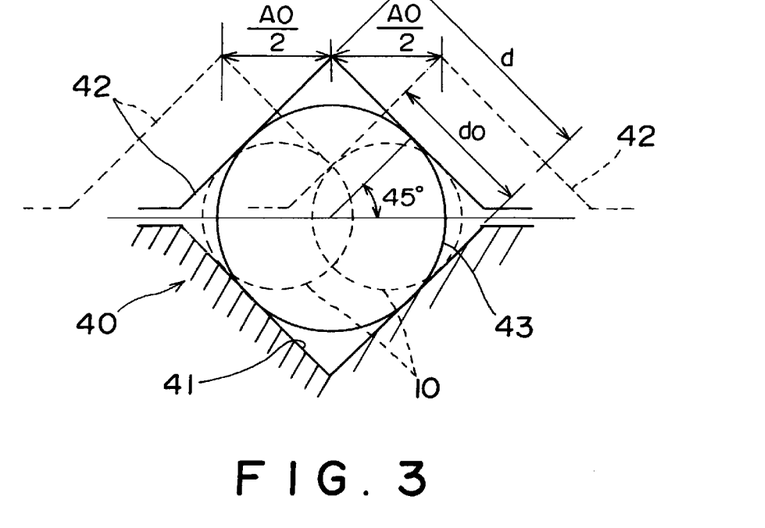
FIG. 3 is a diagram describing a maximum slackness of a ball spline joint.

Assuming that the cross-sections of the spline grooves 41, 42 are right-angled triangles as shown in FIG. 3 of the drawings, the maximum displacement of the spline groove 41 relative to the spline groove 42 is equal to A0 when the measuring balls 10 are between them. The diameter d of the ball 43 at which this maximum distance A0 becomes 0 is calculated by the following equation (2) from the diameter d0 of the measuring balls 10 and from the maximum distance A0 related to the measuring balls 10.

$$d = d0 + \frac{\cos 45° \cdot A0}{2} \qquad (2)$$

Figure 4:
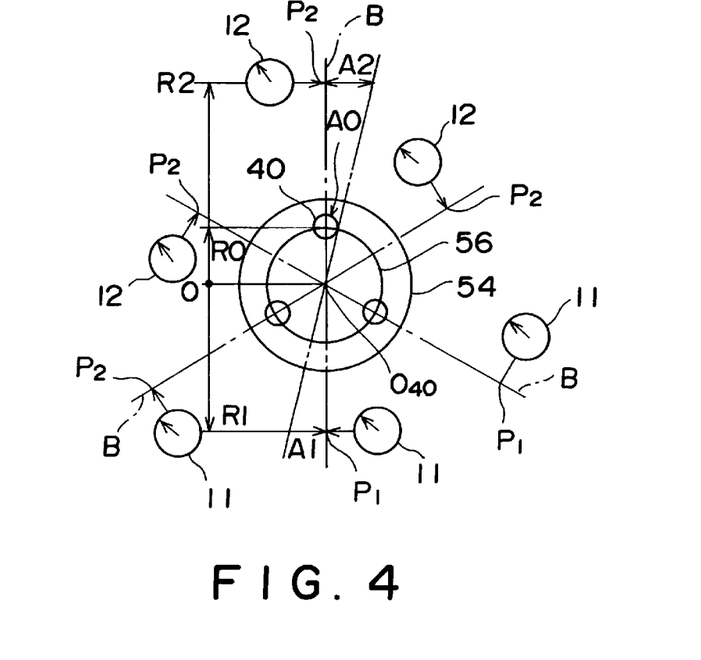
FIG. 4 is a diagram showing an arrangement of gauges in the slackness measuring apparatus.

The principle of measuring the slackness A0 is shown in FIG. 4. First, the slide wheel 54 is rotated in the forward and backward directions by a predetermined torque with plural measuring balls 10 between the spline grooves 41, 42. The displacement amount of the measurement points P1 and P2 at this time is measured by the first gauge 11 and the second gauge 12.

The measurement points P1, P2 are set as follows. Specifically, a straight line B is taken which passes through the center $O_{40}$ of the rotation shaft 56, and the center of a pair of spline grooves 41, 42. The measurement point P1 is set at a distance R1 from the center $O_{40}$ on the line B. The measurement point P2 is set at a distance R2 from the center $O_{40}$ in the opposite direction to the measurement point P1 on the other side of the center $O_{40}$.

In this case, the maximum distance A0 regarding the measuring ball 10 may be expressed by the following equation (3).

$$A0 = \frac{A2 \cdot (R0 + R1) - A1 \cdot (R2 - R0)}{R1 + R2} \qquad (3)$$

Figure 5:
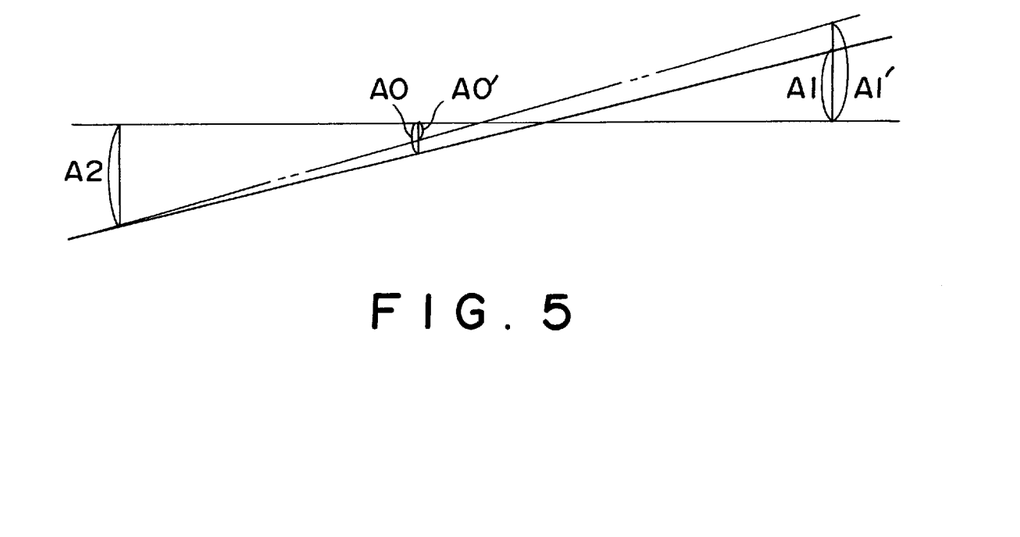
FIG. 5 is a diagram describing a measurement error of slackness occurring in the slackness measuring apparatus.

In this way, when the measurement points P1 and P2 are set on opposite sides of the center $O_{40}$, as shown in FIG. 4, when for example the measured value A1 is obtained as A1' with a given positive error as shown in FIG. 5, the error A0–A0' in the actual value A0 and calculated value A0' of slackness is always smaller than the error A1'–A1. Therefore, the error in the slackness can be suppressed to within a small range.

Figure 1:
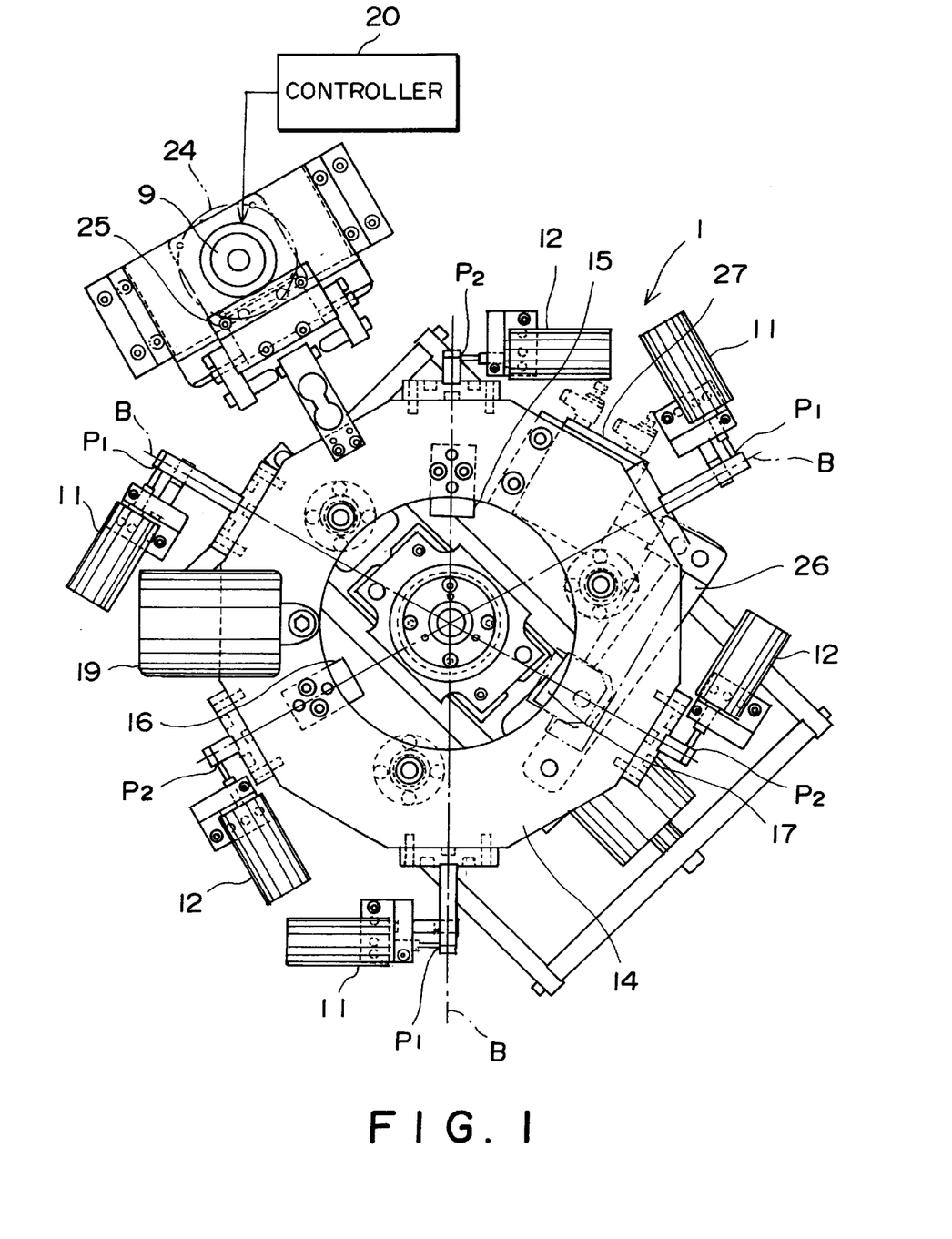
FIG. 1 is a plan view of a slackness measuring apparatus according to this invention.
Figure 2:
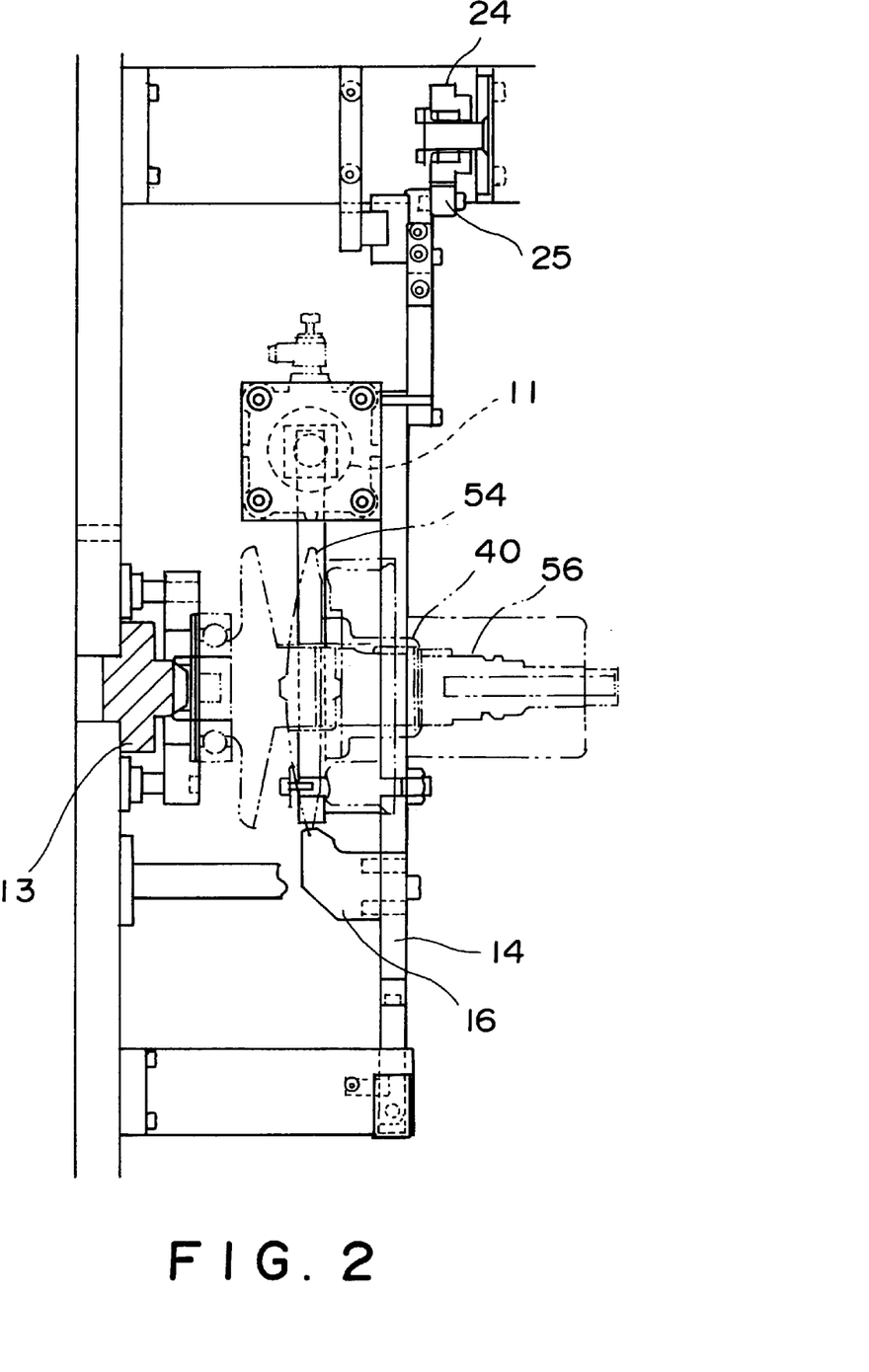
FIG. 2 is a side view of the slackness measuring apparatus.

The slackness measuring apparatus having the construction shown in FIGS. 1 and 2 employs the above principle.

Specifically, in a slackness measuring apparatus 1, the rotation shaft 56 of the fixed wheel 51 is held by a center clamp 13, and the outer circumference of the slide wheel 54 is held by chucks 15–17 supported by a floating plate 14 as shown in FIG. 1. The chucks 15 and 16 are directly fixed by the floating plate 14. The chuck 17 is supported by the floating plate 14 via a lever 26. The lever 26 is rotated according to an actuator 27, and the chuck 17 is pressed against the outer circumference of the slide wheel 54.

The floating plate 14 rotates relative to the center clamp 13 under the drive of a servomotor 9. The servomotor 9 rotates the floating plate 14 via a pinion 24 and a rack 25 which engages with the pinion 24.

The apparatus 1 is provided with three lines B and three sets of measurement points P1 and P2. The slackness measuring apparatus 1 comprises three pairs of first gauges 11 arranged at equal angular intervals for measuring the displacement amount A1 of the aforesaid measurement points P1, and three pairs of second gauges 12 arranged at equal angular intervals for measuring the displacement amount A2 of the aforesaid measurement points P2. These gauges may for example be linear scales.

Figure 6:
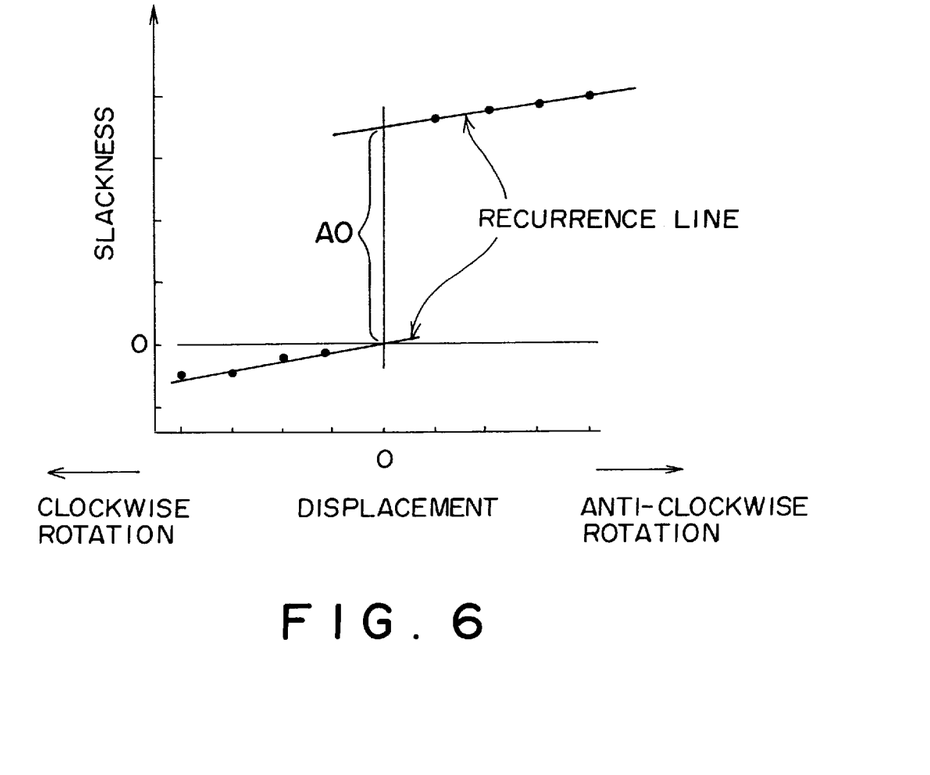
FIG. 6 is a diagram showing a recurring straight line for computing a slackness in the slackness measuring apparatus.

The servomotor 9 is controlled by a controller 20. The controller 20 varies the torque which the servomotor 9 applies to the slide wheel 54 via the floating plate 14 in four stages in both the forward and backward directions as shown in FIG. 6. The displacement amounts A1, A2 of the measurement points P1, P2 at each stage are measured by the first gauges 11 and the second gauges 12. The slackness A0 is computed under no load based on two straight lines joining the measurement values A1, A2.

Calculations are performed for all values measured by the three gauges, and the maximum value is taken as A0.

The value of A0 obtained is substituted in equation (4) based on the aforesaid equation (2), and the diameter d of the ball 43 to be applied is calculated.

$$d = d0 + \frac{\cos 45° \cdot A0}{2} + C \quad (4)$$

where, C=predetermined allowance.

When a V-belt continuously variable transmission is assembled, plural types of the balls 43 having different diameters are prepared, the balls 43 closest to the computed diameter d are selected, and arranged between the spline grooves 41, 42.

It is further desirable that when the balls 43 are inserted in the spline grooves 41, 42 during assembly, the load required to push the balls 43 in against frictional resistance is measured, and if the measured value exceeds a predetermined value, they are replaced by those of smaller diameter.

In this way, the slackness of the ball spline joint 40 can be controlled to high precision.

The longer the servomotor 9 applies a torque to the slide wheel 54, the smaller the error in the computed diameter d of the balls 43. However, the time required to obtain the diameter d increases, and is an obstacle to mass production of the continuously variable transmission. Therefore, the slackness measuring apparatus 1 comprises a vibrator 19 which supplies a vibration in a circumferential direction to the ball spline joint 40, and this vibrator 19 is attached to the floating plate 14.

When the controller 20 causes the servomotor 9 to apply a torque to the slide wheel 54, the vibrator 19 operates for one second and vibrates the floating plate 14. Measurement is then performed by the first gauges 11 and second gauges 12.

By applying a vibration in the circumferential direction to the slide wheel 54 via the floating plate 14, the measuring balls 10 are made to engage with the spline grooves 41, 42 without any gap in a short time. Further, the chucks 15 to 17 of the floating plate 14 and the slide wheel 54 also engage without any gaps. Hence, the slackness A0 can be measured to high precision under the load of a short-term torque applied by the servomotor 9.

According to research performed by the inventors, the same computation precision was obtained by applying a torque with vibration for one second as by applying a torque with no vibration for 60 seconds. Therefore, the slackness measurement time is largely reduced by applying vibration, and this has a desirable effect on mass production of continuously variable transmissions provided with ball splines.

The embodiments of this invention in which an exclusive property or privilege is claimed are defined as follows:

What is claimed is:

1. A method of measuring slackness of a ball spline joint, the joint comprising a first groove formed on a cylindrical outer circumference of a first member, a second groove formed axially on an inner circumference of a second member which is fitted on the outer circumference of the first member, and a ball arranged between the grooves, the method comprising:

setting a first measurement point at a predetermined distance from a center of the first member on a radial line passing through the center of the first member and a center of the first spline groove;

setting a second measurement point at another predetermined distance from the center of the first member on the radial line such that the first measurement point and the second measurement point are arranged on either side of the center of the first member;

applying a predetermined relative rotational torque between the first member and the second member; and computing a slackness of the joint based on a displacement amount of the first measurement point and a displacement amount of the second measurement point under the predetermined relative rotational torque.

2. A slackness measuring method as defined in claim 1, wherein the slackness is computed by the following equation:

$$A0 = \frac{A2 \cdot (R0 + R1) - A1 \cdot (R2 - R0)}{R1 + R2}$$

where,

A0=the slackness

A1=the displacement amount of the first measurement point,

A2=the displacement amount of the second measurement point,

R0=a radius of the first member,

R1=the predetermined distance of the first measurement point from the center of the first member, and R2=the predetermined distance of the second measurement point from the center of the first member.

3. A slackness measuring method as defined in claim 1, wherein the joint comprises plural pairs of first and second grooves, and the method further comprises:

setting first measurement points and second measurement points on respective radial lines corresponding to the plural pairs of first and second grooves;

computing slackness values from respective pairs of the first and second measurement points; and determining the slackness as to be equal to the largest value of the slackness values.

4. A slackness measuring method as defined in claim 1, wherein the method further comprises:

applying a plurality of predetermined relative rotational torques; and determining the slackness to be equal to the slackness when the rotational torque is 0 which is obtained based on a recurrence line joining the displacement amounts of the first measurement points under the predetermined relative rotational torques, and a recurrence line joining the displacement amounts of the second measurement points under the predetermined relative rotational torques.

5. A slackness measuring method as defined in claim 1, wherein the method further comprises:

applying a vibration to the first member and the second member when the predetermined relative rotational torque is applied between the first member and the second member.

6. A slackness measuring method as defined in claim 5, wherein the vibration is a vibration causing a relative movement of the first member and the second member in a circumferential direction along the outer circumference of the first member.

7. An apparatus for measuring slackness of a ball spline joint, the joint comprising a first groove formed on a cylindrical outer circumference of a first member, a second groove formed axially on an inner circumference of a second member which is fitted on the outer circumference of the first member, and a ball arranged between the grooves, the measuring apparatus comprising:

a member which supports the first member;

a member which supports the second member;

a first gauge which measures a rotational displacement of a first measurement point set at a first distance from a center of the first member on a radial line passing through the center and a center of the first groove;

a second gauge which measures a rotational displacement of a second measurement point set at a second distance from the center of the first member on the radial line, the first measuring point and the second measuring point being arranged on either side of the center of the first member;

a mechanism which applies a predetermined relative rotational torque to the first member and the second member when the ball is gripped between the grooves; and a microprocessor programmed to:
calculate a slackness of the joint from the displacement of the first measurement point and the displacement of the second measurement point under the predetermined relative rotational torque.

8. A slackness measuring apparatus as defined in claim 7, wherein the apparatus further comprises:

a vibrator which applies a vibration causing a relative movement of the first member and the second member in a circumferential direction along the outer circumference of the first member.

* * * * *